(12) United States Patent
Zou

(10) Patent No.: US 11,151,228 B2
(45) Date of Patent: Oct. 19, 2021

(54) BLOCKCHAIN-BASED IMAGE TRANSACTION SYSTEM, METHOD, APPARATUS, AND ELECTRONIC DEVICE

(71) Applicant: ADVANCED NEW TECHNOLOGIES CO., LTD., Grand Cayman (KY)

(72) Inventor: Xueqing Zou, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/848,811

(22) Filed: Apr. 14, 2020

(65) Prior Publication Data

US 2020/0242215 A1     Jul. 30, 2020

Related U.S. Application Data

(63) Continuation of application No. PCT/CN2020/070983, filed on Jan. 8, 2020.

(30) Foreign Application Priority Data

Jun. 26, 2019   (CN) .......................... 201910559875.8

(51) Int. Cl.
*G06F 21/10*       (2013.01)
*G06Q 20/40*       (2012.01)
(Continued)

(52) U.S. Cl.
CPC ......... *G06F 21/105* (2013.01); *G06Q 20/405* (2013.01); *G06Q 30/0283* (2013.01);
(Continued)

(58) Field of Classification Search
CPC ............. G06Q 20/405; G06Q 30/0283; G06Q 30/0643; G06Q 2220/16; G06F 21/105; H04L 9/0643; H04L 2209/38
(Continued)

(56) References Cited

U.S. PATENT DOCUMENTS 8,818,900 B2      8/2014  Koka et al.
10,361,866 B1 *   7/2019  Mcgregor et al.
(Continued)

FOREIGN PATENT DOCUMENTS

CN       107705114 A      2/2018
CN       108734576 A      11/2018
(Continued)

OTHER PUBLICATIONS

First Search for Chinese Application No. 201910559875.8 dated May 7, 2020.
(Continued)

*Primary Examiner* — James D Nigh
*Assistant Examiner* — Yin Y Choi

(57) ABSTRACT

The present application discloses a blockchain-based image transaction system, method, and apparatus. An exemplary method comprises: receiving a target image uploaded from a transaction node in a blockchain, wherein the target image is provided to the transaction node by a user; authenticating, based on image content of the target image, copyright of the target image; if the authentication is successful: generating a copyright certificate of the target image; sending the copyright certificate to the transaction node for the transaction node to display the copyright certificate and a preset prompt window to the user, wherein the preset prompt window inquires the user whether to make the target image as an image available for transaction; and if confirmation information is received, adding the target image into an
(Continued)

image transaction pool, wherein the confirmation information indicates the user has determined the target image as an image available for transaction.

19 Claims, 4 Drawing Sheets

(51) Int. Cl.
  *G06Q 30/02* (2012.01)
  *G06Q 30/06* (2012.01)
  *H04L 9/06* (2006.01)
(52) U.S. Cl.
  CPC ....... *G06Q 30/0643* (2013.01); *H04L 9/0643* (2013.01); *G06F 2221/0737* (2013.01); *G06Q 2220/16* (2013.01); *H04L 2209/38* (2013.01); *H04L 2209/56* (2013.01)
(58) Field of Classification Search
  USPC .......................................................... 705/59
  See application file for complete search history.

(56) References Cited

U.S. PATENT DOCUMENTS

| | | | |
|---|---|---|---|
| 2009/0287931 A1* | 11/2009 | Kinsella | |
| 2010/0111298 A1 | 5/2010 | Krig | |
| 2016/0283920 A1 | 9/2016 | Fisher et al. | |
| 2016/0300234 A1 | 10/2016 | Moss-Pultz et al. | |
| 2016/0330034 A1 | 11/2016 | Back et al. | |
| 2017/0206523 A1 | 7/2017 | Goeringer et al. | |
| 2018/0012311 A1 | 1/2018 | Small et al. | |
| 2018/0096175 A1 | 4/2018 | Schmeling et al. | |
| 2018/0137507 A1 | 5/2018 | Jayachandran et al. | |
| 2018/0137512 A1 | 5/2018 | Georgiadis et al. | |
| 2018/0225448 A1 | 8/2018 | Russinovich et al. | |
| 2018/0287893 A1 | 10/2018 | O'Brien et al. | |
| 2018/0302417 A1 | 10/2018 | Wilson | |
| 2018/0374173 A1* | 12/2018 | Chen et al. | |
| 2019/0057115 A1 | 2/2019 | Liu et al. | |
| 2019/0180291 A1* | 6/2019 | Schmeling et al. | |
| 2019/0361869 A1* | 11/2019 | Krabbenhöft et al. | |
| 2020/0051166 A1* | 2/2020 | Loh et al. | |
| 2020/0052882 A1* | 2/2020 | Tummalapenta et al. | |
| 2020/0356546 A1* | 11/2020 | Keskar | |

FOREIGN PATENT DOCUMENTS

| | | |
|---|---|---|
| CN | 109376504 A | 2/2019 |
| CN | 109727134 A | 5/2019 |
| CN | 109740317 | 5/2019 |
| CN | 110321671 A | 10/2019 |

OTHER PUBLICATIONS

First Office Action for Chinese Application No. 201910559875.8 dated May 13, 2020.
Written Opinion and International Search Report for PCT Application No. PCT/CN2020/070983 made available to public on Dec. 30, 2020.

* cited by examiner

BLOCKCHAIN-BASED IMAGE TRANSACTION SYSTEM, METHOD, APPARATUS, AND ELECTRONIC DEVICE

CROSS REFERENCE TO RELATED APPLICATIONS

This application is a continuation application of International Patent Application No. PCT/CN2020/070983, filed on Jan. 8, 2020, which claims priority to Chinese Patent Application No. 201910559875.8, filed on Jun. 26, 2019. The entire content of the above referenced applications are incorporated herein by reference.

TECHNICAL FIELD

The present application relates to the field of computer technologies, and in particular to, a blockchain-based image transaction system, method, apparatus, and electronic device.

BACKGROUND

Along with the rapid development of mobile Internet technologies, more and more users choose online shopping on e-commerce platforms. In comparison to offline shopping, users are unable to physically exam products during online shopping, can only evaluate to-be-purchased products through images or videos about the products provided by an online merchant. Taking apparel products as an example, sellers often hire professional models to wear the apparels for sale, take photos and upload these photos (e.g., images) to the e-commerce platform for the buyer to exam.

However, since the images of the models wearing the apparels are often photoshopped, a user's judgment of the actual effect of the apparels could be affected to a certain degree. In addition, product images uploaded by sellers to the e-commerce platforms may also be downloaded through screenshot or screen recording and used by other merchants. Therefore, solutions are desired regarding how to provide users with credible product images and how to safeguard copyrights of the product images.

SUMMARY

Embodiments of the present application provide a blockchain-based image transaction system, method, apparatus, and electronic device, so as to solve the problems of existing e-commerce platforms that it is difficult to provide users with credible product images and it is difficult to safeguard the copyright of the product images.

To solve the above-described technical problems, the embodiments of the present application are implemented as follows.

According to a first aspect, a blockchain-based image transaction method comprises: receiving a target image uploaded from a transaction node in a blockchain, wherein the target image is provided to the transaction node by a user; authenticating copyright of the target image; if the authentication is successful: generating a copyright certificate of the target image; sending the copyright certificate to the transaction node for the transaction node to display the copyright certificate and a preset prompt window to the user, wherein the preset prompt window inquires the user whether to make the target image as an image available for transaction; and if confirmation information is received, adding the target image into an image transaction pool that stores images available for transaction, wherein the confirmation information indicates the user has determined the target image as an image available for transaction.

In some embodiments, the authenticating copyright of the target image comprises: determining, based on an image recognition technique, if the target image matches an image in a preset original library; and if not, determining copyright of the target image is authenticated.

In some embodiments, the method may further comprise: receiving an image transaction request corresponding to the target image, where the image transaction request triggers a smart contract to process the image transaction request; and after the image transaction request is processed, triggering the smart contract to write a transaction record of the image transaction request into the blockchain.

In some embodiments, the method may further comprise: after the image transaction request is processed, receiving a usage record of the target image and writing the usage record into the blockchain.

In some embodiments, the preset prompt window comprises an option for setting a transaction price for the target image, and the method further comprises: if the transaction price set by the user is received, uploading the transaction price of the target image into the blockchain.

In some embodiments, the method may further comprise: determining a transaction price for the target image according to an average transaction price on a market.

In some embodiments, the copyright certificate of the target image comprises an image hash value of the target image.

In some embodiments, the method may further comprise: storing the copyright certificate in a preset image copyright library, wherein the copyright certificate is indexed based on the image hash value of the target image.

In some embodiments, the preset image copyright library is accessible to the user and the transaction node in the blockchain.

According to another aspect, a system for blockchain-based image transaction comprises one or more processors and one or more non-transitory computer-readable memories coupled to the one or more processors and configured with instructions executable by the one or more processors to cause the system to perform operations comprising: receiving a target image uploaded from a transaction node in a blockchain, wherein the target image is provided to the transaction node by a user; authenticating copyright of the target image; if the authentication is successful: generating a copyright certificate of the target image; sending the copyright certificate to the transaction node for the transaction node to display the copyright certificate and a preset prompt window to the user, wherein the preset prompt window inquires the user whether to make the target image as an image available for transaction; and if confirmation information is received, adding the target image into an image transaction pool that stores images available for transaction, wherein the confirmation information indicates the user has determined the target image as an image available for transaction.

According to another aspect, a non-transitory computer-readable storage medium for blockchain-based image transaction is configured with instructions executable by one or more processors to cause the one or more processors to perform operations comprising: receiving a target image uploaded from a transaction node in a blockchain, wherein the target image is provided to the transaction node by a user; authenticating copyright of the target image; if the authentication is successful: generating a copyright certificate of the target image; sending the copyright certificate to the transaction node for the transaction node to display the copyright certificate and a preset prompt window to the user, wherein the preset prompt window inquires the user whether to make the target image as an image available for transaction; and if confirmation information is received, adding the target image into an image transaction pool that stores images available for transaction, wherein the confirmation information indicates the user has determined the target image as an image available for transaction.

By adopting the above technical solutions, the embodiments of the present application can at least achieve the following technical effects. After a user uploads a target image at a transaction node, the transaction node may upload the target image into a blockchain. Then, a copyright authentication node authenticates, based on the target image, the copyright of the target image, and adds the target image into an image transaction pool when the copyright authentication on the target image is successful, wherein images in the image transaction pool are available for transaction. In this way, all images selected by the transaction node for transaction from the image transaction pool have passed copyright authentication. As a result, the images obtained by the transaction node from the image transaction pool may be displayed to the user on a transaction platform, so that the user can see authorized and credible images.

BRIEF DESCRIPTION OF THE DRAWINGS

The accompanying drawings described herein are used to provide further understanding of the present application and constitute a part of the present application. The exemplary embodiments of the present application and the description thereof are used to describe the present application and do not constitute improper limitations to the present application. In the accompanying drawings.

DETAILED DESCRIPTION

To make the objectives, technical solutions and advantages of the present application clearer, the technical solutions of the present application will be clearly and thoroughly described below with reference to exemplary embodiments of the present application and corresponding accompanying drawings. Apparently, the described embodiments are merely some, but not all, embodiments of the present application. All other embodiments obtained, based on some embodiments of the present application, by one of ordinary skill in the art without creative effort shall fall within the protection scope of the present application. Technical solutions provided by the embodiments of the present application will be described in detail below with reference to the accompanying drawings.

To provide users with credible product images and safeguard the copyright of the product images, the embodiments of the present specification provide a blockchain-based image transaction system.

Figure 1:
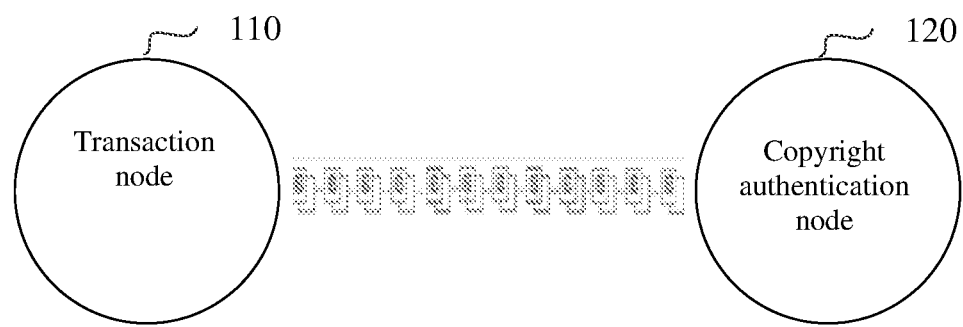
FIG. 1 is a schematic structural flow chart of a blockchain-based image transaction system according to some embodiments of the present specification.

For example, FIG. 1 is a schematic structural diagram of a blockchain-based image transaction system according to some embodiments of the present specification. The system comprises a transaction node 110 and a copyright authentication node 120.

The transaction node 110 is configured to upload a target image of a user into a blockchain. Here, the target image may be a buyer show image taken by the user after purchasing a product from a transaction platform provided by the transaction node or a product image processed by the user using image processing software. All images originally created by the user may be uploaded by the user to the transaction node.

In some embodiments, the target image of the user may further carry an identifier of a copyright authentication node in a blockchain network to enable the copyright authentication node to promptly detect or obtain the target image. In this way, when messages broadcast in the blockchain are monitored at the copyright authentication node, it is feasible to only monitor messages comprising the identifier of the copyright authentication node. Here, the identifier of the copyright authentication node may be a unique identifier of the copyright authentication node in the blockchain.

In some embodiments, to ensure that the target image is uploaded by the transaction node into the blockchain, the target image of the user in the embodiments of the present specification may further carry irreversible check information of the target image. For example, the target image may carry an image digest of the target image and signature information of a signature by the transaction node on the image digest. The signature information may be determined based on the private key of the transaction node. In this way, when the copyright authentication node detects and obtains the target image, the source of the target image can be determined based on the target image and the irreversible check information of the target image. For example, first, an image digest of the target image may be obtained through calculation based on the target image, and then, the signature information of the target image may be decrypted based on the public key of the transaction node to obtain a to-be-checked image digest. If the image digest of the target image obtained through calculation based on the target image is the same as the to-be-checked image digest, it can be determined that the source of the target image is the transaction node.

The copyright authentication node 120 is configured to authenticate, based on image content of the target image, the copyright of the target image, and add the target image into an image transaction pool when the copyright authentication on the target image is successful, wherein images in the image transaction pool are available for transaction.

The authenticating, based on image content of the target image, the copyright of the target image may be, for example, that an image recognition technique is employed to authenticate the copyright of the target image based on the image content of the target image and a preset original image library, wherein images in the preset original image library may be maintained by the copyright authentication node or the blockchain, and all the images in the preset original image library may be images that have been successful in the copyright authentication by the copyright authentication node. If it is determined through the image recognition technique that no image matching the image content of the target image exists in the preset original image library, the copyright authentication on the target image is successful.

In some embodiments, the target image may be added into an image transaction pool after the copyright authentication on the target image is successful in the embodiments of the present specification. Images added into the image transaction pool may be available to all transaction nodes in the blockchain or transaction platforms or users who have registered blockchain accounts, so that these transaction nodes, transaction platforms and users may conduct transaction on the images in the image transaction pool.

In some embodiments, to ensure that all transactions of the images in the image transaction pool are authorized by image owners, the copyright authentication node generates, based on the target image, a copyright certificate of the target image when the copyright authentication on the target image is successful; the copyright authentication node sends the copyright certificate of the target image to the transaction node, so that the transaction node displays the copyright certificate of the target image and a preset prompt window to the user, wherein the preset prompt window is configured to prompt the user whether to determine the target image to be an image available for transaction; and if the copyright authentication node receives confirmation information from the transaction node, the copyright authentication node adds the target image into the image transaction pool. Here, the confirmation information indicate that the user has determined the target image as an image available for transaction.

To prevent the target image originally created by the user from being used by the transaction node without authorization, the copyright certificate of the target image in the embodiments of the present specification may further comprise an image hash value of the target image, and the image hash value of the target image is used for obtaining the copyright certificate of the target image from a preset image copyright library. Here, the preset image copyright library may be maintained by the blockchain or the copyright authentication node and may be open for (e.g., accessible by) users, transaction platforms, and transaction nodes for determining whether the copyright certificate exists and determining the legitimacy of the copyright certificate based on the image hash value carried in the copyright certificate. That is, the copyright certificate stored in the image copyright library may be indexed and looked up based on the image hash value carried in the copyright certificate.

It should be understood that, to facilitate the recording and differentiation of copyright certificates of various images, the copyright certificate of the target image may further comprise owner information, upload time, upload node (e.g., an identifier corresponding to the transaction node uploading the target image), and a brief description of the image content of the target image.

In some embodiments, to facilitate the user to set a transaction price for the target image, the preset prompt window further comprises an option for setting a transaction price of a target image, and after the copyright authentication node sends the copyright certificate of the target image to the transaction node, the transaction node displays the copyright certificate of the target image and the preset prompt window to the user; and if the transaction node confirms that the user determines the target image to be an image available for transaction and confirms a transaction price of the target image set by the user, the transaction node uploads the determination of the user that the target image is an image available for transaction and the transaction price of the target image into the blockchain.

The option for setting a transaction price of a target image comprised in the preset prompt window may be optional, i.e., the user may select to set a transaction price of the target image or may select not to set a transaction price of the target image. When the user selects not to set a transaction price of the target image, the transaction price of the target image may be provided through the transaction node according to an average transaction price on the market.

To facilitate the transaction process of the transaction node based on the target image to proceed smoothly, a designated smart contract may be configured in advance to execute the image transaction process in the embodiments of the present specification.

In some embodiments, the copyright authentication node adding the target image into the image transaction pool comprises: the copyright authentication node adds the target image and the transaction price of the target image into the image transaction pool.

In some embodiments, a portion of the designated smart contract related to the transaction price may be set to be a to-be-filled field. Namely, after the transaction node uploads the determination of the user that the target image is an image available for transaction and the transaction price of the target image into the blockchain, the to-be-filled field may be filled up according to the transaction price of the target image.

In some embodiments, after the copyright authentication node adds the target image into the image transaction pool, and if the transaction node selects the target image from the image transaction pool for transaction, then the transaction node obtains the target image from the image transaction pool; and the transaction node sends, based on the target image, a transaction request to the blockchain, so as to trigger a designated smart contract corresponding to the target image to complete a transaction of the target image, and to trigger the designated smart contract to upload, after the transaction is completed, a transaction record corresponding to the transaction into the blockchain.

In some embodiments, the designated smart contract in the embodiments of the present specification may further upload, after each image transaction is completed, a transaction record corresponding to the transaction into the blockchain, so that other nodes (e.g., a judicial agency node) in the blockchain confirm and record this transaction record for evidence collection when transaction disputes occur later.

In some embodiments, to prevent the transaction node from authorizing, without permission, the target image for use by other users, transaction platforms, and transaction nodes (e.g., infringing the copyright of the target image), after the transaction node triggers the smart contract corresponding to the target image to complete the transaction of the target image, the transaction node may upload a usage record of the target image into the blockchain.

In some embodiments, to reduce difficulties in collecting evidence when infringement disputes occur during use of the target image, the transaction node may upload a usage record of the target image into the blockchain, so that other nodes in the blockchain, such as the copyright authentication node and a judicial agency node, confirm and record this usage record of the target image.

It should be understood that the authenticity of product images uploaded by a seller or merchant on an e-commerce platform is uncertain since these product images are often photoshopped. In this case, buyer show images in a product review zone uploaded by other users who have purchased the products can provide credible product use experience to the potential buyers since the authenticity of those images is relatively high. Therefore, before purchasing a product, many buyers would often check reviews and buyer show images of the product by other users who have purchased the product in the product review zone. At this point, to improve the purchase rate of the product for sale, the seller or merchant on the e-commerce platform may transaction (e.g., purchase, license) some high-quality buyer show images uploaded by users to show on its platform.

Figure 2:
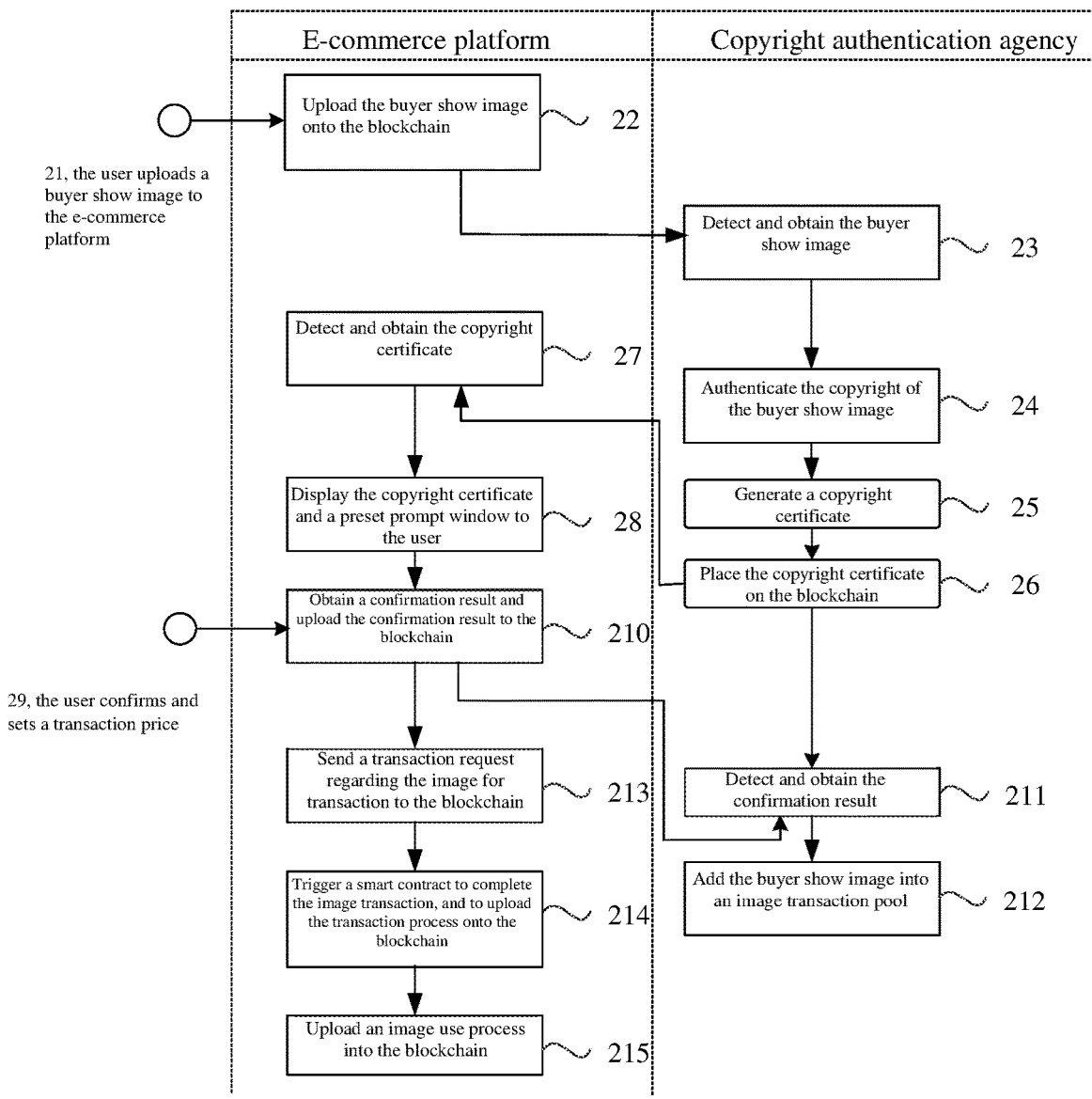
FIG. 2 is a schematic diagram of an application of the blockchain-based image transaction system in an exemplary scenario according to some embodiments of the present specification.

FIG. 2 will be used as an example for detailed description of the system according to some embodiments of the present specification. As shown in FIG. 2, in the example, the transaction node is an e-commerce platform in the blockchain, the copyright authentication node is a copyright authentication agency in the blockchain, and the process of copyright authentication and transaction of a buyer show image uploaded by the user will be described in detail.

The flow chart in FIG. 2 includes the following main steps: S21, the user uploads an original buyer show image taken or processed by the user to the e-commerce platform; S22, the e-commerce platform uploads the buyer show image into the blockchain, the buyer show image carrying an identifier of the copyright authentication agency, so that the blockchain broadcasts the buyer show image; S23, the copyright authentication agency detects and obtains the buyer show image carrying the identifier of the copyright authentication agency in the blockchain; S24, the copyright authentication agency authenticates, based on the buyer show image and a preset original image library, the copyright of the buyer show image; S25, if the copyright authentication of the buyer show image by the copyright authentication agency is successful, the copyright authentication agency generates a copyright certificate based on image content, upload time, upload platform, and image owner of the buyer show image; S26, the copyright authentication agency uploads the copyright certificate into the blockchain, the copyright certificate further carrying an identifier of the e-commerce platform; S27, the e-commerce platform detects and obtains the copyright certificate carrying the identifier of the e-commerce platform; S28, the e-commerce platform displays the copyright certificate and a preset prompt window to the user, the preset prompt window comprising a required selection for determining whether to set the buyer show image to be available for transaction and an option for setting a transaction price of the buyer show image; S29, the user confirms the required selection to set the buyer show image to be available for transaction and sets the transaction price of the buyer show image; S210, the e-commerce platform obtains a confirmation result and uploads the confirmation result to the blockchain, the confirmation result carrying the identifier of the copyright authentication agency; S211, the copyright authentication agency detects and obtains the confirmation result; S212, the copyright authentication agency adds the buyer show image into an image transaction pool; S213, the e-commerce platform selects an image for transaction from the image transaction pool and sends a transaction request regarding the image for transaction to the blockchain; S214, a designated smart contract corresponding to the image for transaction is triggered, based on the transaction request sent by the e-commerce platform, so as to complete a transaction process of the image for transaction, and the transaction process is uploaded into the blockchain; and S215, the e-commerce platform uploads a use process of the image into the blockchain.

It should be understood that, to facilitate the e-commerce platform to select an image for transaction from the image transaction pool, an image added into the image transaction pool may use content of the image as an image identifier, for example, use a product type contained in the image as the image identifier. In addition, images in the image transaction pool may also be classified in advance based on image content of the images. When the e-commerce platform is selecting an image for transaction from the image transaction pool, a search window may be provided to the e-commerce platform. The e-commerce platform may input a product keyword into the search window; alternatively, a product classification list may be provided to the e-commerce platform below the search window, so as to guide the e-commerce platform to search for an image meeting the needs of the e-commerce platform in the product classification list.

After a user uploads a target image at a transaction node, the transaction node may upload the target image into a blockchain. Then, a copyright authentication node authenticates the copyright of the target image (based on the content of the target image), and adds the target image into an image transaction pool when the copyright authentication on the target image is successful, wherein images in the image transaction pool are available for transaction. In this way, all images selected by the transaction node for transaction from the image transaction pool have passed copyright authentication. As a result, the images obtained by the transaction node from the image transaction pool may be displayed to the user on a transaction platform, so that the user can see authorized and credible images.

Figure 3:
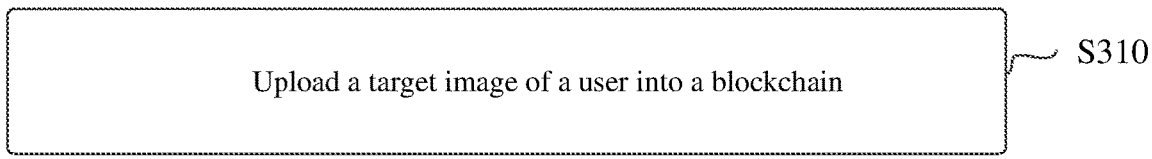
FIG. 3 is a schematic flow chart of an application of a blockchain-based image transaction method on a transaction node according to some embodiments of the present specification.

FIG. 3 is a schematic flow chart of an application of a blockchain-based image transaction method on a transaction node according to some embodiments of the present specification. The method comprises:

S310, uploading a target image of a user into a blockchain, so that a copyright authentication node in the blockchain authenticates, based on image content of the target image, the copyright of the target image, and adds the target image into an image transaction pool when the copyright authentication on the target image is successful, wherein images in the image transaction pool are available for transaction.

In some embodiments, after the copyright authentication node adds the target image into the image transaction pool, the method further comprises: obtaining the target image from the image transaction pool; and sending, based on the target image, a transaction request to the blockchain, so as to trigger a designated smart contract corresponding to the target image to process the transaction request (e.g., to complete a transaction of the target image), and to trigger the designated smart contract to upload, after the transaction is completed, a transaction record corresponding to the transaction into the blockchain.

In some embodiments, after triggering the designated smart contract corresponding to the target image to complete the transaction of the target image, the method further comprises: uploading a usage record of the target image into the blockchain.

In some embodiments, after uploading the target image of the user into the blockchain, the method further comprises: receiving the copyright certificate of the target image from the copyright authentication node; displaying the copyright certificate of the target image and a preset prompt window to the user, the preset prompt window further comprising an option for setting a transaction price of a target image; and if confirming that the user determines the target image to be an image available for transaction and confirming a transaction price of the target image set by the user, uploading the determination of the user that the target image is an image available for transaction and the transaction price of the target image into the blockchain.

In some embodiments, the copyright certificate of the target image comprises an image hash value of the target image, and the image hash value of the target image is used for retrieving the copyright certificate of the target image from a preset image copyright library.

For detailed implementation of relevant steps in the embodiment shown in FIG. 3, detailed implementation of corresponding steps in the embodiments shown in FIG. 1 to FIG. 2 may be referenced, which will not be repeated in one or more embodiments of the present specification.

After a user uploads a target image at a transaction node, the transaction node may upload the target image into a blockchain. Then, a copyright authentication node authenticates, based on the target image, the copyright of the target image, and adds the target image into an image transaction pool when the copyright authentication on the target image is successful, wherein images in the image transaction pool are available for transaction. In this way, all images selected by the transaction node for transaction from the image transaction pool have passed copyright authentication. As a result, the images obtained by the transaction node from the image transaction pool may be displayed to the user on a transaction platform, so that the user can see authorized and credible images.

Figure 4:
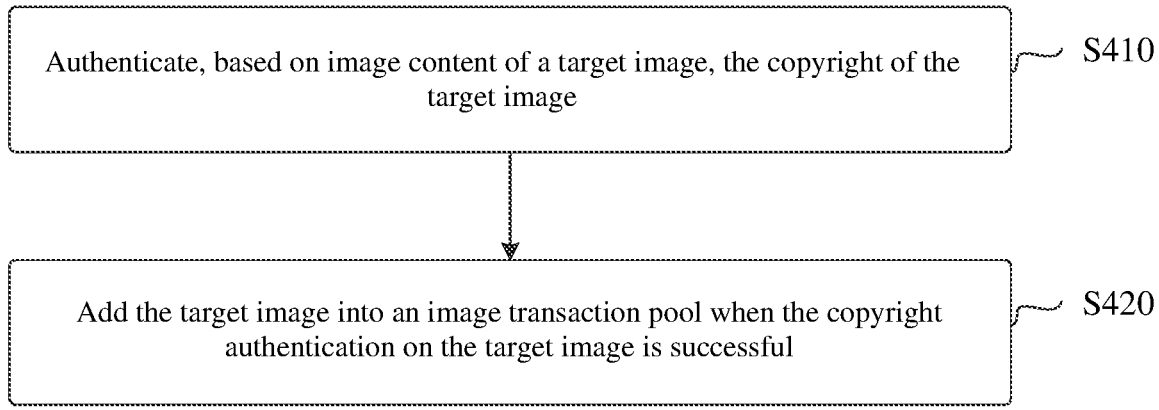
FIG. 4 is a schematic flow chart of an application of a blockchain-based image transaction method on a copyright authentication node according to some embodiments of the present specification.

FIG. 4 is a schematic flow chart of an application of a blockchain-based image transaction method on a copyright authentication node according to some embodiments of the present specification. The method comprises: S410, authenticating, based on image content of the target image, the copyright of the target image; and S420, adding the target image into an image transaction pool when the copyright authentication on the target image is successful, wherein the target image is uploaded by a transaction node in a blockchain into the blockchain, and images in the image transaction pool are available for transaction.

In some embodiments, the adding the target image into an image transaction pool when the copyright authentication on the target image is successful comprises: generating, based on the target image, a copyright certificate of the target image when the copyright authentication on the target image is successful; sending the copyright certificate of the target image to the transaction node, so that the transaction node displays the copyright certificate of the target image and a preset prompt window to the user, wherein the preset prompt window is configured to prompt the user whether to determine the target image to be an image available for transaction; and if receiving confirmation information from the transaction node, the confirmation information being used for instructing the user to determine the target image to be an image available for transaction, then adding, by the copyright authentication node, the target image into the image transaction pool.

In some embodiments, the adding the target image into an image transaction pool comprises: adding the target image and a transaction price of the target image into the image transaction pool.

In some embodiments, the copyright certificate of the target image comprises an image hash value of the target image, and the image hash value of the target image is used for retrieving the copyright certificate of the target image from a preset image copyright library.

For detailed implementation of relevant steps in the embodiment shown in FIG. 4, detailed implementation of corresponding steps in the embodiments shown in FIG. 1 to FIG. 2 may be referenced, which will not be repeated in one or more embodiments of the present specification.

After a user uploads a target image at a transaction node, the transaction node may upload the target image into a blockchain. Then, a copyright authentication node authenticates, based on the target image, the copyright of the target image, and adds the target image into an image transaction pool when the copyright authentication on the target image is successful, wherein images in the image transaction pool are available for transaction. In this way, all images selected by the transaction node for transaction from the image transaction pool have passed copyright authentication. As a result, the images obtained by the transaction node from the image transaction pool may be displayed to the user on a transaction platform, so that the user can see authorized and credible images.

Figure 5:
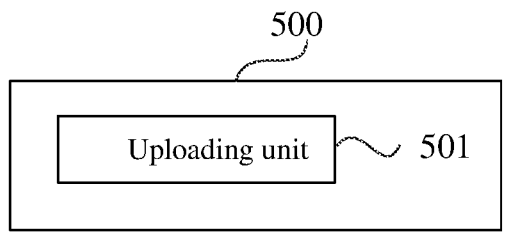
FIG. 5 is a schematic structural diagram of a transaction node according to some embodiments of the present specification.

FIG. 5 is a schematic structural diagram of a transaction node 500 according to some embodiments of the present specification. Referring to FIG. 5, in a software implementation, the transaction node 500 may comprise an uploading unit 501, wherein the uploading unit 501 is configured to upload a target image of a user into a blockchain, so that a copyright authentication node in the blockchain authenticates, based on image content of the target image, the copyright of the target image, and adds the target image into an image transaction pool when the copyright authentication on the target image is successful, wherein images in the image transaction pool are available for transaction.

In some embodiments, in some implementations, after the copyright authentication node adds the target image into the image transaction pool, the transaction node further comprises: an obtaining unit 502 configured to obtain the target image from the image transaction pool; and a sending unit 503 configured to send, based on the target image, a transaction request to the blockchain, so as to trigger a designated smart contract corresponding to the target image to complete a transaction of the target image, and to trigger the designated smart contract to upload, after the transaction is completed, a transaction record corresponding to the transaction into the blockchain.

In some exemplary implementations, after triggering the designated smart contract corresponding to the target image to complete the transaction of the target image, the transaction node further comprises: a first uploading unit 504 configured to upload a usage record of the target image into the blockchain.

In some embodiments, after the uploading unit 501 uploads the target image of the user into the blockchain, the transaction node further comprises: a receiving unit 505 configured to receive the copyright certificate of the target image from the copyright authentication node; and a displaying unit 506 configured to display the copyright certificate of the target image and a preset prompt window to the user, the preset prompt window further comprising an option for setting a transaction price of a target image; and a second uploading unit 507 configured to upload, if confirming that the user determines the target image to be an image available for transaction and confirming a transaction price of the target image set by the user, the confirmation information that the user determines the target image to be an image available for transaction and the transaction price of the target image into the blockchain.

In some embodiments, the copyright certificate of the target image comprises an image hash value of the target image, and the image hash value of the target image is used for obtaining the copyright certificate of the target image from a preset image copyright library.

The transaction node 500 can implement the method in the method embodiment shown in FIG. 3, and the blockchain-based image transaction method according to the embodiment shown in FIG. 3 may be referenced for details, which will not be repeated.

Figure 6:
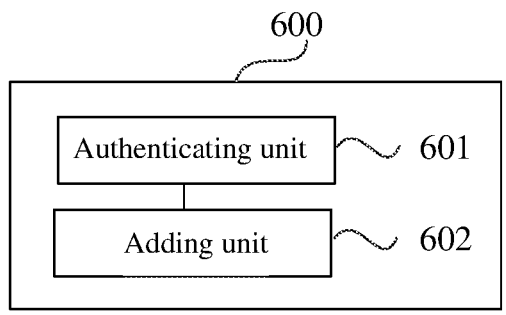
FIG. 6 is a schematic structural diagram of a copyright authentication node according to some embodiments of the present specification.

FIG. 6 is a schematic structural diagram of a copyright authentication node 600 according to some embodiments of the present specification. Referring to FIG. 6, in a software implementation, the copyright authentication node 600 may comprise an authenticating unit 601 and an adding unit 602, wherein the authenticating unit 601 is configured to authenticate, based on image content of the target image, the copyright of the target image; and the adding unit 602 is configured to add the target image into an image transaction pool when the copyright authentication on the target image is successful, wherein the target image is uploaded by a transaction node in a blockchain into the blockchain, and images in the image transaction pool are available for transaction.

In some embodiments, the adding unit 602 is configured to generate, based on the target image, a copyright certificate of the target image when the copyright authentication on the target image is successful; send the copyright certificate of the target image to the transaction node, so that the transaction node displays the copyright certificate of the target image and a preset prompt window to the user, wherein the preset prompt window is configured to prompt the user whether to determine the target image to be an image available for transaction; and if receiving confirmation information from the transaction node, the confirmation information being used for instructing the user to determine the target image to be an image available for transaction, then add, by the copyright authentication node, the target image into the image transaction pool.

In some embodiments, the adding unit 602 is configured to add the target image and a transaction price of the target image into the image transaction pool.

In some embodiments, the copyright certificate of the target image comprises an image hash value of the target image, and the image hash value of the target image is used for obtaining the copyright certificate of the target image from a preset image copyright library.

The copyright authentication node 600 can implement the method in the method embodiment shown in FIG. 4, and the blockchain-based image transaction method according to the embodiment shown in FIG. 4 may be referenced for details, which will not be repeated.

Figure 7:
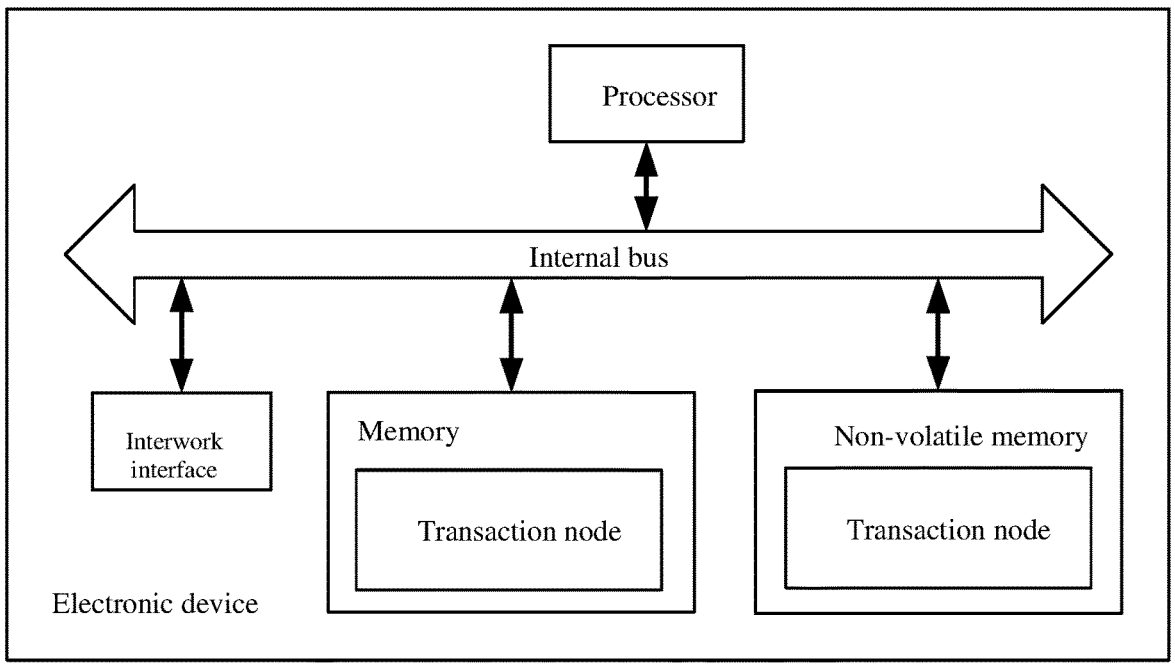
FIG. 7 is a schematic structural diagram of an electronic device according to some embodiments of the present specification.

FIG. 7 is a schematic structural diagram of an electronic device according to some embodiments of the present specification. Referring to FIG. 7, at a hardware level, the electronic device comprises a processor, and, in some embodiments, may further comprise an internal bus, a network interface, and a memory, wherein the memory may comprise an internal memory, such as a Random-Access Memory (RAM), and may further comprise a non-volatile memory, such as at least one magnetic disk memory. The electronic device may also comprise hardware required by other businesses.

The processor, the network interface, and the memory may be connected to each other via the internal bus. The internal bus may be an Industry Standard Architecture (ISA) bus, a Peripheral Component Interconnect (PCI) bus, or an Extended Industry Standard Architecture (EISA) bus. The bus may be divided into an address bus, a data bus, a control bus, and the like. For convenience of description, only one two-way arrow is used in FIG. 7 to represent the bus, which does not indicate that there is only one bus or one type of buses.

The memory is used for storing programs. For example, the programs may comprise program codes, and the program codes comprise computer operation instructions. The memory may comprise an internal memory and a non-volatile memory, and may provide instructions and data to the processor.

The processor reads a corresponding computer program from the non-volatile memory into the internal memory, and then executes the computer program to form a transaction node on the logical level. The processor executes programs stored in the memory and is configured, for example, to execute the following operation: uploading a target image of a user into a blockchain, so that a copyright authentication node in the blockchain authenticates, based on image content of the target image, the copyright of the target image, and adds the target image into an image transaction pool when the copyright authentication on the target image is successful, wherein images in the image transaction pool are available for transaction.

The blockchain-based image transaction method disclosed by the embodiment as shown in FIG. 3 of the present specification may be applied to a process or may be implemented by the processor. The processor may be an integrated circuit chip with signal processing capabilities. In an implementation process, the steps of the above-described method may be carried out by an integrated logic circuit of the hardware or instructions in the form of software in the processor. The above-described processor may be a general-purpose processor, including a Central Processing Unit (CPU), a Network Processor (NP), a Digital Signal Processor (DSP), an Application Specific Integrated Circuit (ASIC), a Field-Programmable Gate Array (FPGA), or other programmable logic devices, discrete gates or transistor logic devices, and discrete hardware components, which can implement or execute the methods, steps, and logic block diagrams disclosed in the embodiments of the present specification. The general-purpose processor may be a microprocessor, or the processor may also be any conventional processor. Steps of the method disclosed with reference to the embodiments of the present specification may be directly executed and completed by a hardware decoding processor or executed and completed by a combination of hardware and software modules in a decoding processor. The software modules may be disposed in a mature storage medium in the art, such as a random memory, a flash memory, a read-only memory, a programmable read-only memory, or an electrically erasable programmable memory, a register and the like. The storage medium is disposed in the memory, and the processor reads information in the memory and completes the steps of the above-described methods in combination with the hardware thereof.

The electronic device may further implement the blockchain-based image transaction method shown in FIG. 3 and described in the specification, which will not be repeated here in the present specification.

In addition to the software implementation, the electronic device of the present specification does not exclude other implementations, such as logic devices or a manner in which software and hardware are combined, etc. In other words, the execution body of the following processing flow is not limited to various logic units and may also be hardware or logic devices.

The embodiments of the present application further provide a computer readable storage medium storing one or more programs, the one or more programs comprising instructions, wherein the instructions, when being executed by a portable electronic device comprising a plurality of applications, cause the portable electronic device to implement the method according to the embodiment shown in FIG. 3 and described in the specification, and for example, to perform the following operation: uploading a target image of a user into a blockchain, so that a copyright authentication node in the blockchain authenticates, based on image content of the target image, the copyright of the target image, and adds the target image into an image transaction pool when the copyright authentication on the target image is successful, wherein images in the image transaction pool are available for transaction.

Figure 8:
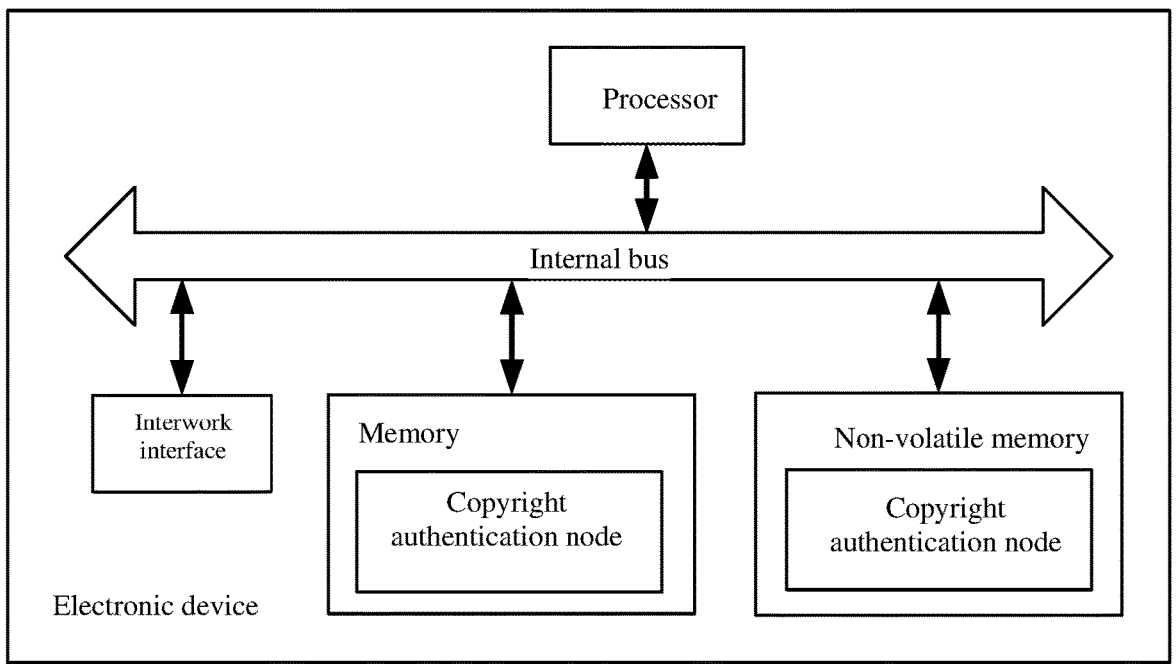
FIG. 8 is a schematic structural diagram of another electronic device according to some embodiments of the present specification.

FIG. 8 is a schematic structural diagram of an electronic device according to some embodiments of the present specification. Referring to FIG. 8, at a hardware level, the electronic device comprises a processor, and, in some embodiments, may further comprise an internal bus, a network interface, and a memory, wherein the memory may comprise an internal memory, such as a Random-Access Memory (RAM), and may further comprise a non-volatile memory, such as at least one magnetic disk memory. The electronic device may also comprise hardware required by other business.

The processor, the network interface, and the memory may be connected to each other via the internal bus. The internal bus may be an Industry Standard Architecture (ISA) bus, a Peripheral Component Interconnect (PCI) bus, or an Extended Industry Standard Architecture (EISA) bus. The bus may be divided into an address bus, a data bus, a control bus, and the like. For convenience of description, only one two-way arrow is used in FIG. 8 to represent the bus, which does not indicate that there is only one bus or one type of buses.

The memory is used for storing programs. For example, the programs may comprise program codes, and the program codes comprise computer operation instructions. The memory may comprise an internal memory and a non-volatile memory, and may provide instructions and data to the processor.

The processor reads a corresponding computer program from the non-volatile memory into the internal memory, and then executes the computer program to form a copyright authentication node on the logical level. The processor executes programs stored in the memory and is configured, for example, to execute the following operations: authenticating, based on image content of the target image, the copyright of the target image; and adding the target image into an image transaction pool when the copyright authentication on the target image is successful, wherein the target image is uploaded by a transaction node in a blockchain into the blockchain, and images in the image transaction pool are available for transaction.

The blockchain-based image transaction method disclosed by the embodiment as shown in FIG. 4 of the present specification may be applied to a process or may be implemented by the processor. The processor may be an integrated circuit chip with signal processing capabilities. In an implementation process, the steps of the above-described method may be carried out by an integrated logic circuit of the hardware or instructions in the form of software in the processor. The above-described processor may be a general-purpose processor, including a Central Processing Unit (CPU), a Network Processor (NP), a Digital Signal Processor (DSP), an Application Specific Integrated Circuit (ASIC), a Field-Programmable Gate Array (FPGA), or other programmable logic devices, discrete gates or transistor logic devices, and discrete hardware components, which can implement or execute the methods, steps, and logic block diagrams disclosed in the embodiments of the present specification. The general-purpose processor may be a microprocessor, or the processor may also be any conventional processor. Steps of the method disclosed with reference to the embodiments of the present specification may be directly executed and completed by a hardware decoding processor or executed and completed by a combination of hardware and software modules in a decoding processor. The software modules may be disposed in a mature storage medium in the art, such as a random memory, a flash memory, a read-only memory, a programmable read-only memory, or an electrically erasable programmable memory, a register and the like. The storage medium is disposed in the memory, and the processor reads information in the memory and completes the steps of the above-described methods in combination with the hardware thereof.

The electronic device may further implement the blockchain-based image transaction method shown in FIG. 4, which will not be repeated here in the present specification.

In addition to the software implementation, the electronic device of the present specification does not exclude other implementations, such as logic devices or a manner in which software and hardware are combined, etc. In other words, the execution body of the following processing flow is not limited to various logic units and may also be hardware or logic devices.

The embodiments of the present application further provide a computer readable storage medium storing one or more programs, the one or more programs comprising instructions, wherein the instructions, when being executed by a portable electronic device comprising a plurality of applications, cause the portable electronic device to implement the method according to the embodiment shown in FIG. 4, and for example, to perform the following operations: authenticating, based on image content of the target image, the copyright of the target image; and adding the target image into an image transaction pool when the copyright authentication on the target image is successful, wherein the target image is uploaded by a transaction node in a blockchain into the blockchain, and images in the image transaction pool are available for transaction.

In summary, the above-described is merely preferred embodiments of the present specification, which are not used to limit the scope of the present specification. Any modification, equivalent substitution, or improvement made within the spirit and principle of the embodiments of the present specification shall fall within the scope of the embodiments of the present specification.

The system, device, module, or unit elaborated in the embodiments may be achieved, for example, by a computer chip or entity or by a product having a function. One typical implementation apparatus is a computer, and an exemplary form of the computer may be a personal computer, a laptop computer, a cellular telephone, a camera phone, a smart phone, a personal digital assistant, a media player, a navigation device, an email device, a game console, a tablet computer, a wearable device, or a combination of any of the above apparatuses.

Computer readable media include permanent, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, magnetic cassettes, magnetic cassette and disk memories or other magnetic storage devices, or any other non-transmission media, which can be used for storing information accessible to a computation device. According to the description in the specification, the computer readable media do not include transitory media, such as modulated data signals and carriers.

It should be further noted that the terms of "including," "comprising," or any other variants of the terms are intended to encompass a non-exclusive inclusion, causing a process, method, product, or device comprising a series of elements to not only comprise these elements, but also comprise other elements that are not clearly listed, or further comprise elements that are inherent to the process, method, product, or device. When there is no further restriction, elements described by the statement "comprising one . . . " does not exclude that a process, method, product, or device comprising the above elements further comprises additional identical elements.

The various embodiments in the present specification are described in a progressive manner, the same or similar parts between the various embodiments may refer to each other, and each embodiment focuses on the differences from the other embodiments. In particular, since the system embodiments are substantially similar to the method embodiments, the system embodiments are described in a relatively simple manner, and the description of relevant parts of the method embodiments may be referenced.

What is claimed is:

1. A computer-implemented method, the method comprising:
   receiving, by an authentication node in a blockchain network, a target image uploaded from a transaction node in the blockchain network, wherein the target image comprises an image digest of the target image and a signature of the image digest signed with a private key of the transaction node, wherein the target image is provided to the transaction node by a user;
   decrypting, the authentication node, the signature based on a public key of the transaction node to obtain an unverified image digest;
   determining, by the authentication node, whether the unverified image digest is consistent with the image digest of the target image;
   upon determining the unverified image digest being consistent with the image digest, determining, by the authentication node, whether the target image has a match in an image library based on image recognition
   upon determining that the target image has no match in the image library, generating, by the authentication node, a copyright certificate of the target image, uploading the copyright certificate to a blockchain, and sending the copyright certificate to the transaction node;
   displaying, by the transaction node, the copyright certificate and a prompt window to the user;
   receiving, by the transaction node, an input from the user responding to the prompt window;
   updating, by the transaction node, a preconfigured smart contract based on the input from the user responding to the prompt window, wherein the preconfigured smart contract comprises one or more unfilled fields, and the updating of the preconfigured smart contract comprises filling the one or more unfilled fields based on the input; and
   upon receiving an image request requesting the target image, processing, by the transaction node triggering the updated preconfigured smart contract, the image request and uploading a record of the image request to the blockchain.

2. The method according to claim 1, further comprising:
   adding, by the authentication node based on the input from the user, the target image into an image pool.

3. The method according to claim 2, further comprising:
   receiving, by the transaction node in the blockchain network, a usage record of the target image and writing the usage record into the blockchain.

4. The method according to claim 1, wherein the preset prompt window comprises an option for setting a transaction price for the target image, the one or more unfilled fields of the preconfigured smart contract comprises a price field corresponding to the transaction price, and
   the method further comprises:
   if the transaction price set by the user is received by the transaction node, filling the price field of the preconfigured smart contract with the transaction price for the target image.

5. The method according to claim 1, further comprising:
   determining a transaction price for the target image according to an average transaction price on a market; and
   filling one of the one or more unfilled fields of the preconfigured smart contract with the transaction price for the target image.

6. The method according to claim 1, wherein the copyright certificate of the target image comprises a hash value of the target image.

7. The method according to claim 6, the method further comprising:
   generating an index for the copyright certificate based on the hash value of the target image; and
   storing the copyright certificate in a preset image copyright library based on the index.

8. The method according to claim 7, wherein the preset image copyright library is accessible to the user and the transaction node in the blockchain network.

9. A system for managing images in a blockchain, comprising one or more processors and one or more non-transitory computer-readable memories coupled to the one or more processors and configured with instructions executable by the one or more processors to cause the system to perform operations comprising:

receiving a target image from a transaction node in a blockchain network wherein the target image comprises an image digest of the target image and a signature of the image digest signed with a private key of the transaction node, wherein the target image is provided to the transaction node by a user;

decrypting the signature based on a public key of the transaction node to obtain an unverified image digest;

determining whether the unverified image digest is consistent with the image digest of the target image;

upon determining the unverified image digest being consistent with the image digest, determining whether the target image has a match in an image library based on image recognition;

upon determining that the target image has no match in the image library, generating a copyright certificate of the target image, uploading the copyright certificate to the blockchain, and sending the copyright certificate to the transaction node;

displaying the copyright certificate and a prompt window to the user;

receiving an input from the user responding to the prompt window;

updating a preconfigured smart contract based on the input from the user responding to the prompt window, wherein the preconfigured smart contract comprises one or more unfilled fields, and the updating of the preconfigured smart contract comprises filling the one or more unfilled fields based on the input; and upon receiving an image request requesting the target image, processing, by triggering the updated preconfigured smart contract, the image request and uploading a record of the image request to the blockchain.

10. The system according to claim 9, wherein the copyright certificate of the target image comprises a hash value of the target image.

11. The system according to claim 10, wherein the operations further comprise:

storing the copyright certificate in a preset image copyright library, wherein the copyright certificate is indexed based on the hash value of the target image.

12. The system according to claim 9, wherein the operations further comprise:

after the image request is processed, receiving a usage record of the target image and writing the usage record into the blockchain.

13. The system according to claim 9, wherein the prompt window comprises an option for setting a transaction price for the target image, the one or more unfilled fields of the preconfigured smart contract comprises a price field corresponding to the transaction price, and the operations further comprise:

if the transaction price set by the user is received, filling the price field of the preconfigured smart contract with the transaction price for the target image.

14. The system according to claim 9, wherein the operations further comprise:

determining a transaction price for the target image according to an average transaction price on a market; and filling one of the one or more unfilled fields of the preconfigured smart contract with the transaction price for the target image.

15. A non-transitory computer-readable storage medium for managing images in a blockchain configured with instructions executable by one or more processors to cause the one or more processors to perform operations comprising:

receiving a target image from a transaction node in a blockchain network wherein the target image comprises an image digest of the target image and a signature of the image digest signed with a private key of the transaction node, wherein the target image is provided to the transaction node by a user;

decrypting the signature based on a public key of the transaction node to obtain an unverified image digest;

determining whether the unverified image digest is consistent with the image digest of the target image;

upon determining the unverified image digest being consistent with the image digest, determining whether the target image has a match in an image library based on image recognition;

upon determining that the target image has no match in the image library, generating a copyright certificate of the target image, uploading the copyright certificate to the blockchain, and sending the copyright certificate to the transaction node;

displaying the copyright certificate and a prompt window to the user;

receiving an input from the user responding to the prompt window;

updating a preconfigured smart contract based on the input from the user responding to the prompt window, wherein the preconfigured smart contract comprises one or more unfilled fields, and the updating of the preconfigured smart contract comprises filling the one or more unfilled fields based on the input; and upon receiving an image request requesting the target image, processing, by triggering the updated preconfigured smart contract, the image request and uploading a record of the image request to the blockchain.

16. The storage medium according to claim 15, wherein the copyright certificate of the target image comprises a hash value of the target image.

17. The storage medium according to claim 16, wherein the operations further comprise:

generating an index for the copyright certificate based on the hash value of the target image; and storing the copyright certificate in a preset image copyright library based on the index.

18. The storage medium according to claim 15, wherein the operations further comprise:

after the image request is processed, receiving a usage record of the image and writing the usage record into the blockchain network.

19. The storage medium according to claim 15, wherein the preset prompt window comprises an option for setting a transaction price for the target image, the one or more unfilled fields of the preconfigured smart contract comprises a price field corresponding to the transaction price, and the operations further comprise:

if the transaction price set by the user is received, filling the price field of the preconfigured smart contract with the transaction price for the target image.

* * * * *

UNITED STATES PATENT AND TRADEMARK OFFICE
CERTIFICATE OF CORRECTION

| | | |
|---|---|---|
| PATENT NO. | : 11,151,228 B2 | |
| APPLICATION NO. | : 16/848811 | |
| DATED | : October 19, 2021 | |
| INVENTOR(S) | : Xueqing Zou | |

It is certified that error appears in the above-identified patent and that said Letters Patent is hereby corrected as shown below:

In the Claims

Claim 1, Column 15, Line 54, "a target image uploaded from a transaction node" should read -- a target image from a transaction node --.

Claim 1, Column 15, Line 60, "decrypting, the authentication node" should read -- decrypting, by the authentication node --.

Claim 4, Column 16, Lines 32-33, "the preset prompt" should read -- the prompt --.

Claim 19, Column 18, Line 56, "the preset prompt" should read -- the prompt --.

Signed and Sealed this
Thirteenth Day of June, 2023

Katherine Kelly Vidal
*Director of the United States Patent and Trademark Office*